(12) United States Patent
Kim et al.

(10) Patent No.: US 7,433,124 B2
(45) Date of Patent: *Oct. 7, 2008

(54) ILLUMINATION SYSTEM TO ELIMINATE LASER SPECKLE AND A SINGLE-PANEL PROJECTION SYSTEM EMPLOYING THE SAME

(75) Inventors: Sung-ha Kim, Seoul (KR); Sang-whoe Dho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

This patent is subject to a terminal disclaimer.

(21) Appl. No.: 11/234,091

(22) Filed: Sep. 26, 2005

(65) Prior Publication Data

US 2006/0092515 A1    May 4, 2006

(30) Foreign Application Priority Data

Oct. 28, 2004    (KR) .................... 10-2004-0086543

(51) Int. Cl.
*G02B 5/18* (2006.01)

(52) U.S. Cl. ...................... 359/569; 359/566

(58) Field of Classification Search ................ 359/566, 359/568, 569; 353/30–37, 46–51; 348/744–789
See application file for complete search history.

(56) References Cited

U.S. PATENT DOCUMENTS

| 6,726,333 B2 | 4/2004 | Huibers et al. | |
| 6,747,781 B2 * | 6/2004 | Trisnadi | 359/279 |
| 6,863,401 B2 * | 3/2005 | Penn | 353/31 |
| 6,874,893 B2 * | 4/2005 | Park | 353/84 |
| 2003/0174755 A1 | 9/2003 | Lai et al. | |

FOREIGN PATENT DOCUMENTS

| JP | 2002-90881 | 3/2002 |
| JP | 2002-277820 | 9/2002 |
| KR | 2003-46500 | 6/2003 |
| KR | 2003-48862 A | 6/2003 |
| KR | 2003-61316 | 7/2003 |
| KR | 2003-79714 | 10/2003 |
| KR | 2004-20636 A | 3/2004 |
| KR | 2004-68725 | 8/2004 |

OTHER PUBLICATIONS

Wang et al. "Speckle reduction in laser projection systems by diffractive optical elements", Applied Optics, vol. 37, No. 10 (Apr. 1, 1998), pp. 1770-1775.*
Korean Office Action dated Mar. 30, 2006, issued in KR 2004-86543.

* cited by examiner

*Primary Examiner*—Stephone B. Allen
(74) *Attorney, Agent, or Firm*—Stanzione & Kim, LLP

(57) ABSTRACT

An illumination system designed to eliminate laser speckle and a single-panel projection system employing the same. The illumination system includes a laser light source to sequentially emit a plurality of laser beams, and a first diffractive optical element that is partitioned into a plurality of segments having diffractive patterns that correspond to the plurality of laser beams to move synchronously with the sequential emission of the plurality of laser beams. The laser speckle is removed by moving the first diffractive optical element in such a manner as to temporally average the plurality of laser beams. The illumination system efficiently removes the laser speckle, and the projection system having the illumination system provides improved image quality.

34 Claims, 5 Drawing Sheets

ILLUMINATION SYSTEM TO ELIMINATE LASER SPECKLE AND A SINGLE-PANEL PROJECTION SYSTEM EMPLOYING THE SAME

CROSS-REFERENCE TO RELATED APPLICATIONS

This application claims priority from Korean Patent Application No. 2004-86543, filed on Oct. 28, 2004, in the Korean Intellectual Property Office, the disclosure of which is incorporated herein in its entirety by reference.

BACKGROUND OF THE INVENTION

1. Field of the Invention

The present general inventive concept relates to an illumination system designed to eliminate speckle produced by laser light and a projection system employing the same, and more particularly, to an illumination system designed to efficiently reduce or eliminate laser speckle using a movable diffractive optical element to temporally and spatially average partial beams and a single-panel projection system employing the same.

2. Description of the Related Art

A projection system that uses a laser light source provides a wide range of color rendition due to a wide color gamut while achieving high optical efficiency due to superior collimation. However, the projection system that uses the laser light source suffers from speckle caused by coherency of a laser beam. The speckle results from interference of beams having a random phase when coherent beams are reflected from a rough surface. The speckle degrades a resolution and a quality of an image produced by the projection system.

Figure 1:
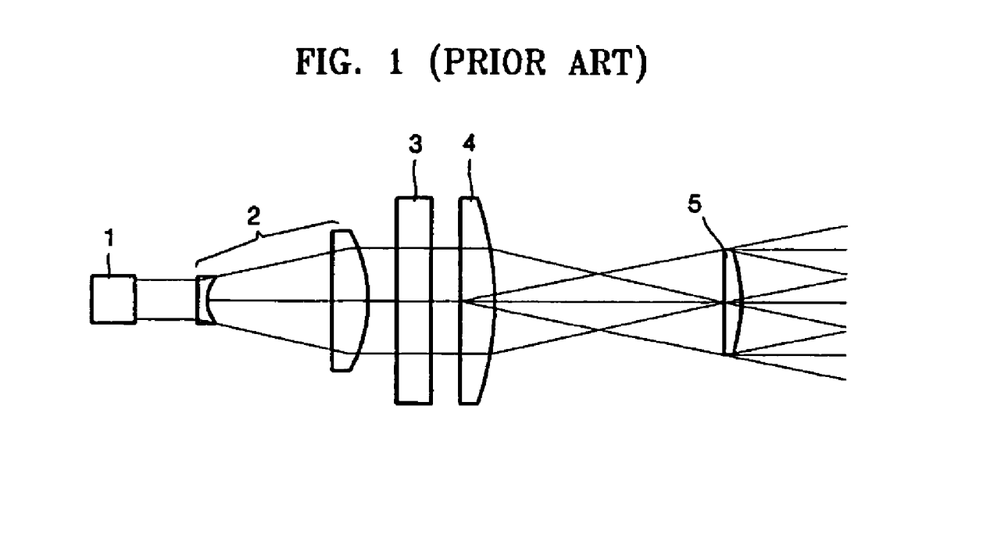
FIG. 1 illustrates a conventional illumination system for a laser projector.

FIG. 1 illustrates a conventional illumination system disclosed in U.S. Pat. No. 6,606,173 B2 that attempts to eliminate laser speckle. Referring to FIG. 1, the conventional illumination system includes a laser light source 1, a beam expander 2, a holographic diffuser 3, a first field lens 4, and a second field lens 5. All elements of the conventional illumination system are coaxially aligned to convert a Gaussian laser beam emitted by the laser light source 1 into a plurality of uniform beams having rectangular cross-sections.

Figure 2:
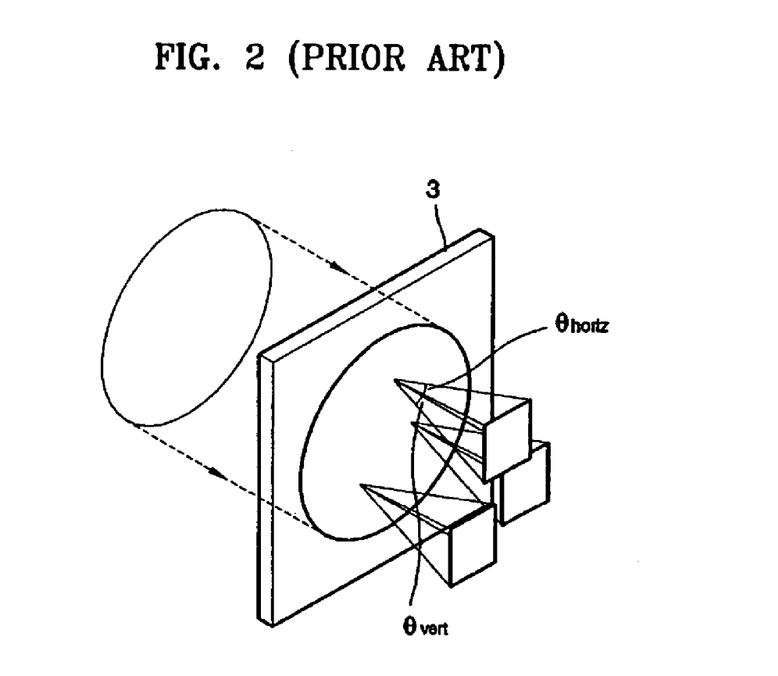
FIG. 2 illustrates beams with rectangular profiles created by a holographic diffuser of the conventional illumination system of FIG. 1.

FIG. 2 illustrates beams having rectangular profiles created by the holographic diffuser 3 in the conventional illumination system of FIG. 1. Referring to FIGS. 1 and 2, a beam emitted by the laser light source 1 is converted to a parallel expanded beam having an increased diameter that is then partitioned into a plurality of rectangular beams by the holographic diffuser 3. Each rectangular beam diverges with horizontal and vertical angles $\theta_{horiz}$ and $\theta_{ver}$, respectively, that can be controlled by a diffraction pattern of the holographic diffuser 3. The first field lens 4 superimposes the plurality of rectangular beams in order to convert the beam having a Gaussian distribution (i.e., the Gaussian laser beam) into a beam having a uniform intensity and to adjust a small rectangular profile of the uniform intensity beam to match an aspect ratio of a micro-display. The second field lens 5 converts the beam that passes through the first field lens 4 to be telecentric.

The holographic diffuser 3 produces rectangular beams with uniform intensity distributions that are then superimposed on one another, thereby eliminating speckle. However, using only the holographic diffuser 3 degrades efficiency of speckle removal and image quality.

SUMMARY OF THE INVENTION

The present general inventive concept provides a slim and compact illumination system designed to efficiently reduce or eliminate laser speckle by rotating or periodically moving a diffractive optical element partitioned according to wavelength and a projection system employing the same.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an illumination system including: a laser light source to sequentially emit a plurality of laser beams, and a first diffractive optical element that is partitioned into a plurality of segments having diffractive patterns that correspond to the plurality of laser beams to move synchronously with the sequential emission of the plurality of laser beams. Laser speckle is removed by moving the first diffractive optical element in such a manner as to temporally average the plurality of laser beams.

The first diffractive optical element may have a wheel-like shape that is rotatable. Alternatively, the first diffractive optical element may have a rectangular shape that is linearly reciprocatable. The first diffractive optical element may convert an incident beam emitted by the laser light source into a plurality of beamlets and superimpose and focus the plurality of beamlets, thereby spatially averaging the incident beam.

The illumination system may further include a second diffractive optical element to shape a beam that passes through the first diffractive optical element to match an aspect ratio of a display device that produces an image from the shaped beam. The second diffractive optical element may control a divergence angle of an incident beam in such a manner as to increase an F-number.

The foregoing and/or other aspects of the present general inventive concept may also be achieved by providing a projection system including: a laser light source to sequentially emit a plurality of laser beams, a first diffractive optical element that is partitioned into a plurality of segments having diffractive patterns that correspond to the plurality of laser beams to remove laser speckle by moving synchronously with the sequential emission of the plurality of laser beams in such a manner as to temporally average the laser beams, a second diffractive optical element to shape a beam that passes through the first diffractive optical element to match a geometry of a display device that produces an image from the shaped beam, a display device to produce the image using the shaped beam that passes through the second diffractive optical element, and a projection lens unit to enlarge and project the produced image onto a screen.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 3A:
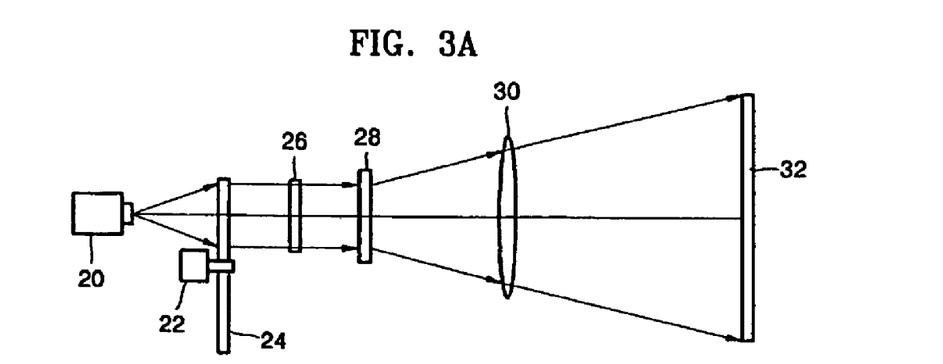
FIG. 3A schematically illustrates a single-panel projection system according to an embodiment of the present general inventive concept.

FIG. 3A illustrates a projection system designed to eliminate laser speckle according to an embodiment of the present general inventive concept. Referring to FIG. 3A, the projection system includes a laser light source 20, a first diffractive optical element 24 rotatable to remove the speckle of a laser beam emitted by the laser light source 20, and a display device 28 to produce an image using the beam that passes through the first diffractive optical element 24.

The projection system further includes a second diffractive optical element 26 that is disposed in an optical path between the first diffractive optical element 24 that removes the speckle and the display device 28 and to shape the beam that passes through the first diffractive optical element 24, and a projection lens unit 30 to enlarge and project the image produced by the display device 28 onto a screen 32. The laser light source 20 sequentially emits laser beams having a plurality of wavelengths.

Figure 3B:
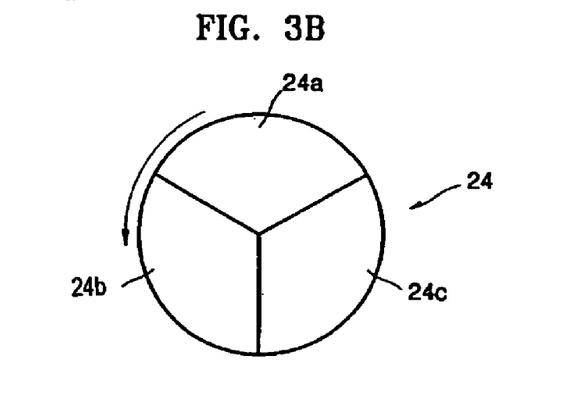
FIG. 3B is a front view illustrating a first diffractive optical element having a wheel-like shape of the projection system of FIG. 3A.

FIG. 3B illustrates the first diffractive optical element 24 of the projection system of FIG. 3A. Referring to FIG. 3B, the first diffractive optical element 24 has a wheel-like shape and is divided into first, second, and third segments 24a, 24b, and 24c having wavelength-dependent diffractive patterns. For example, the first, second, and third segments 24a, 24b, and 24c may have patterns that correspond to red, green, and blue beams, respectively.

Since a diffraction efficiency of a typical diffractive optical element depends on a wavelength of an incident beam, the first diffractive optical element 24 may be designed to have a pattern that optimizes diffraction efficiency. Thus, the first diffractive optical element 24 may include segments having patterns that are optimally designed according to the wavelength(s) of the laser beam(s) used in the projection system.

Referring to FIGS. 3A and 3B, the first diffractive optical element 24 is rotated by a motor 22 synchronously with the sequential light emission of the laser light source 20 such that red, green, and blue beams emitted by the laser light source 20 respectively pass through the first, second, and third segments 24a, 24b, and 24c of the first diffractive optical element 24. The first diffractive optical element 24 rotates to temporally average the laser beams emitted by the laser light source 20, thereby efficiently removing laser speckle.

Figure 4:
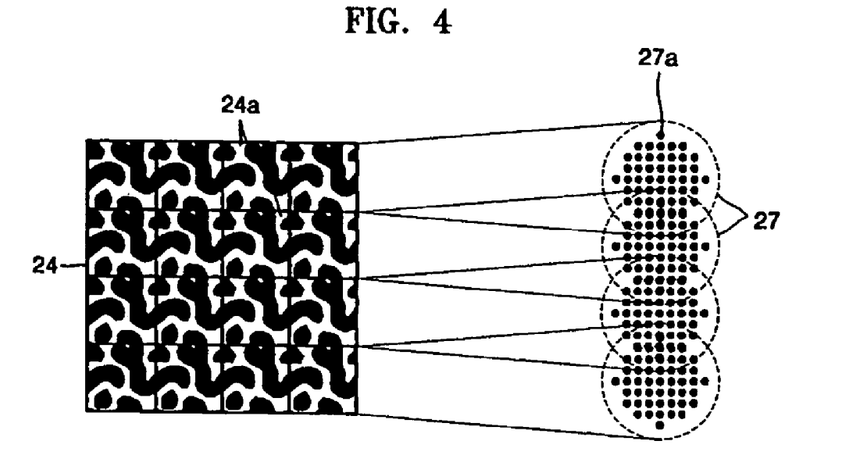
FIG. 4 illustrates profiles of partial beams produced by the first diffractive optical element of FIG. 3B.

FIG. 4 illustrates profiles of partial beams produced by the first diffractive optical element 24 of the projection system of FIG. 3A. Referring to FIG. 4, the first diffractive optical element 24 includes a plurality of unit cells 24a. The laser beams emitted by the laser light source 20 are subdivided into a plurality of partial beams 27 having different phases and optical paths as the laser beams pass through the plurality of unit cells 24a. The plurality of partial beams 27 are then superimposed on one another and focused. Each of the plurality of partial beams 27 comprises multiple beamlets 27a. The black and white portions of the unit cells 24a represent the diffractive pattern of the corresponding segment. The first, second, and third segments 24a, 24b, and 24c may have diffractive patterns that are the same or different. In particular, the first, second, and third segments may have the diffractive pattern of the unit cells 24a illustrated in FIG. 4. The first diffractive optical element 24 rotates in such a manner as to average the laser beams both spatially and temporally, thereby eliminating laser speckle more efficiently.

Figure 5A:
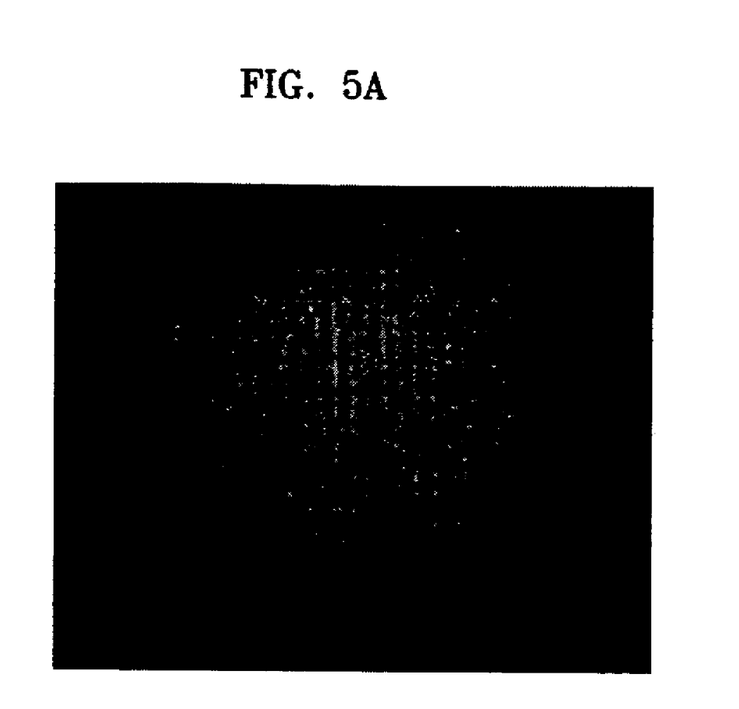
FIG. 5A illustrates an illumination beam in which laser speckle is observed.
Figure 5B:
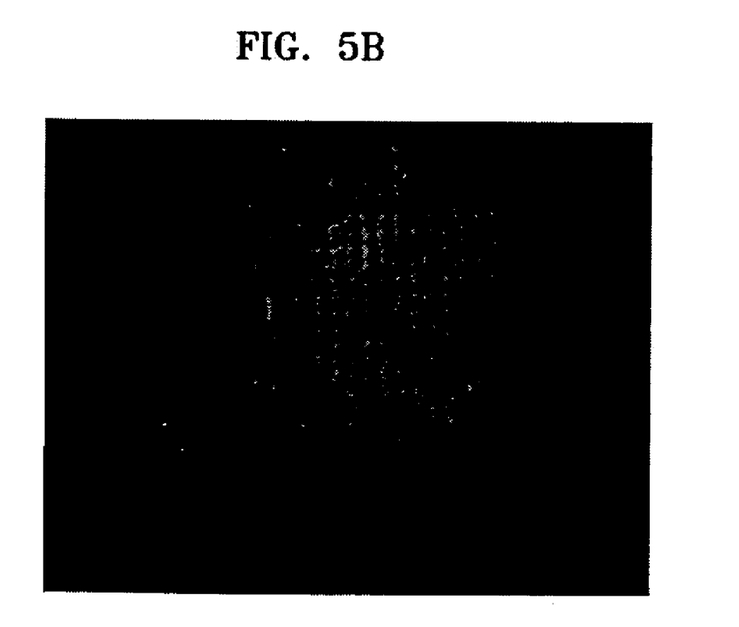
FIG. 5B illustrates an illumination beam from which laser speckle is removed by an illumination system of the projection system of FIG. 3A.

FIG. 5A illustrates a laser beam in which laser speckle is observed, and FIG. 5B illustrates a laser beam from which the laser speckle is removed by rotating the first diffractive optical element 24 according to an embodiment of the present general inventive concept. When a contrast of the laser speckle is less than 4%, the laser speckle cannot be detected by the naked eye. The laser speckle contrast C is defined by Equation (1):

$$C = \frac{\sqrt{\langle I_i^2 \rangle - \langle I_i \rangle^2}}{\langle I_i \rangle} = \frac{\sigma}{\mu} \times 100(\%) \tag{1}$$

where $I_i$ represents an average intensity of a beam that passes through an i-th unit cell of a diffractive optical element (e.g., the first diffractive optical element 24), $\sigma$ represents a standard deviation of the intensity values, and $\mu$ represents a mean intensity value.

Referring to FIG. 3A, the first diffractive optical element 24 converts the laser beam emitted by the laser light source 20, which has the Gaussian distribution (i.e., the Gaussian laser beam) to have a uniform intensity distribution. That is, the laser beam having the Gaussian distribution is subdivided into a plurality of partial beams by the first diffractive optical element 24. The plurality of partial beams are then superimposed on one another, focused, and averaged both temporally and spatially by the first diffractive optical element 24 in order to produce the beam having the uniform intensity distribution, thereby improving the image quality.

Figure 6:
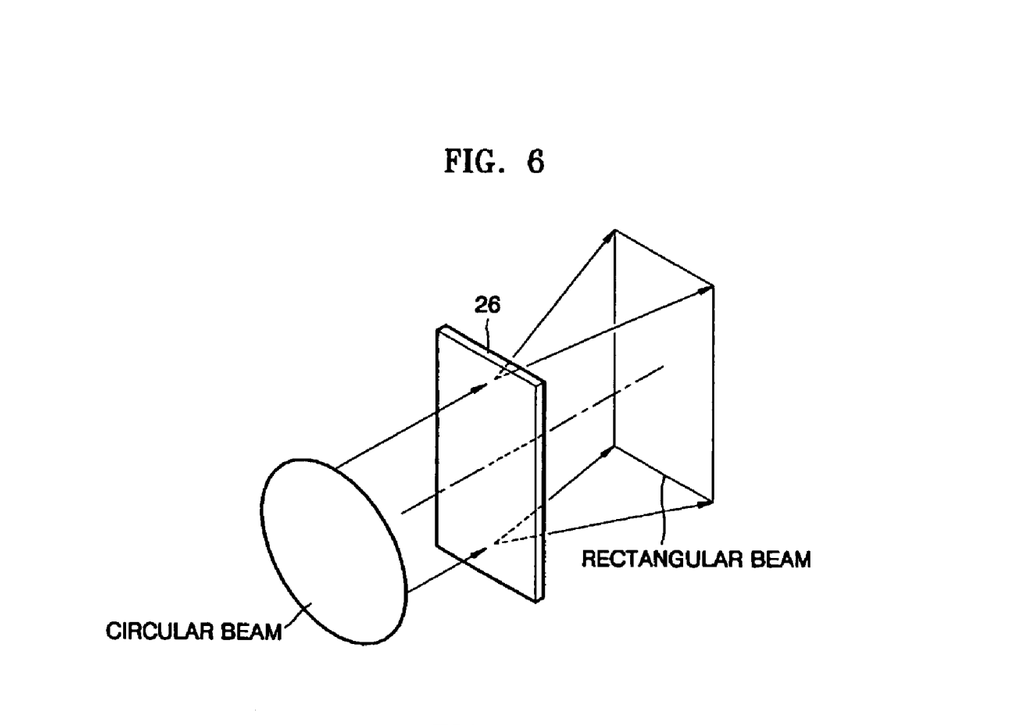
FIG. 6 illustrates a profile of a beam shaped by a second diffractive optical element of the projection system of FIG. 3A.

The second diffractive optical element 26 shapes a cross-section of the uniform intensity beam that passes through the first diffractive optical element 24 to match the aspect ratio of the display device 28. The display device 28 may be a transmissive liquid crystal display (LCD), a Liquid Crystal on Silicon (LCoS) display, a Deformable Micromirror Device (DMD), or a Grating Light Valve (GLV). The display device 28 has a rectangular shape with an aspect ratio of 4:3 or 16:9. The display device 28 may alternatively have other aspect ratios. The beam emitted by the laser light source 20, which has a circular cross-section, is shaped to match the aspect ratio of the display device 28. Thus, as illustrated in FIG. 6, the circular beam is converted into a rectangular beam by the second diffractive optical element 26 to match the aspect ratio of the display device 28.

A diffractive pattern of the second diffractive optical element 26 controls a divergence angle of the incident beam. By controlling the divergence angle of the incident beam in such a manner as to increase an F-number of an illumination system, a slim and compact projection system can be provided.

The rectangular beam shaped by the second diffractive optical element 26 is incident on the display device 28, and the image produced by the display device 28 is enlarged and projected onto the screen 32 by the projection lens unit 30.

The laser light source 20 includes a plurality of lasers to sequentially emit color beams having different wavelengths. For example, the laser light source 20 may include first, second, and third lasers to emit red, green, and blue beams, respectively. Images that correspond to the red, green, and blue beams are sequentially produced and projected onto the screen 32 in order to produce a color image. The display device 28 includes a single panel and sequentially modulates the red, green, and blue beams emitted by the laser light source 20 according to image signals that correspond to the respective wavelengths (i.e., of the color beams).

An illumination system according to an embodiment of the present general inventive concept includes a laser light source 20 having a plurality of lasers to emit beams having different wavelengths, a first diffractive optical element 24 to eliminate speckle of a beam emitted by the laser light source 20, and a second diffractive optical element 26 to shape an incident beam to match a geometry of a display device 28. The first diffractive optical element 24 may have a wheel-like shape that is divided into segments having diffractive patterns that correspond to wavelengths of the plurality of beams emitted by the laser light source 20.

The first diffractive optical element 24 may be designed to provide an optimal diffraction efficiency according to the wavelength of an incident beam. The diffraction efficiency $D_{\mathit{eff}}$ of a diffractive optical element is defined by Equation (2):

$$D_{\mathit{eff}} = \left\{ \frac{\operatorname{Sin}[\pi \times (\lambda_D/\lambda - 1)]}{\pi \times (\lambda_D/\lambda - 1)} \right\}^2 \quad (2)$$

where $\lambda_D$ and $\lambda$ represent a design wavelength of the diffractive optical element and an actual wavelength used in the diffractive optical element, respectively. By using a beam having a wavelength that is equal to the design wavelength, the diffractive optical element achieves 100% diffraction efficiency. However, using a beam having a wavelength that is different than the design wavelength degrades the diffraction efficiency. Therefore, the first diffractive optical element 24 can be designed to have a design wavelength that corresponds to the laser light source 20 that is used in the illumination system illustrated in FIG. 3A.

Figure 7A:
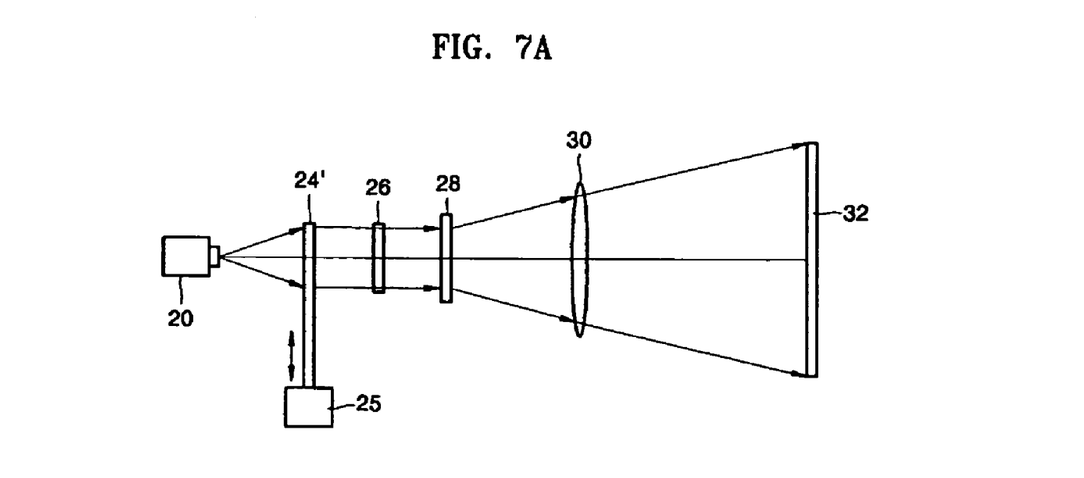
FIG. 7A illustrates a single-panel projection system according to another embodiment of the present general inventive concept.

Although the first diffractive optical element 24 is described as removing speckle by rotating in such a manner as to temporally and spatially average partial beams, it should be understood that the first diffractive optical element 24 may have other configurations. In particular, FIG. 7A illustrates a projection system according to another embodiment of the present general inventive concept. The projection system includes a transport 25 to drive a first diffractive optical element 24' having a rectangular shape to reciprocate linearly in order to average an incident beam both temporally and spatially.

Since elements of the projection system illustrated in FIG. 7A with the same reference numerals as the projection system illustrated in FIG. 3A perform similar functions and/or operations, another description of these elements will not be provided.

Figure 7B:
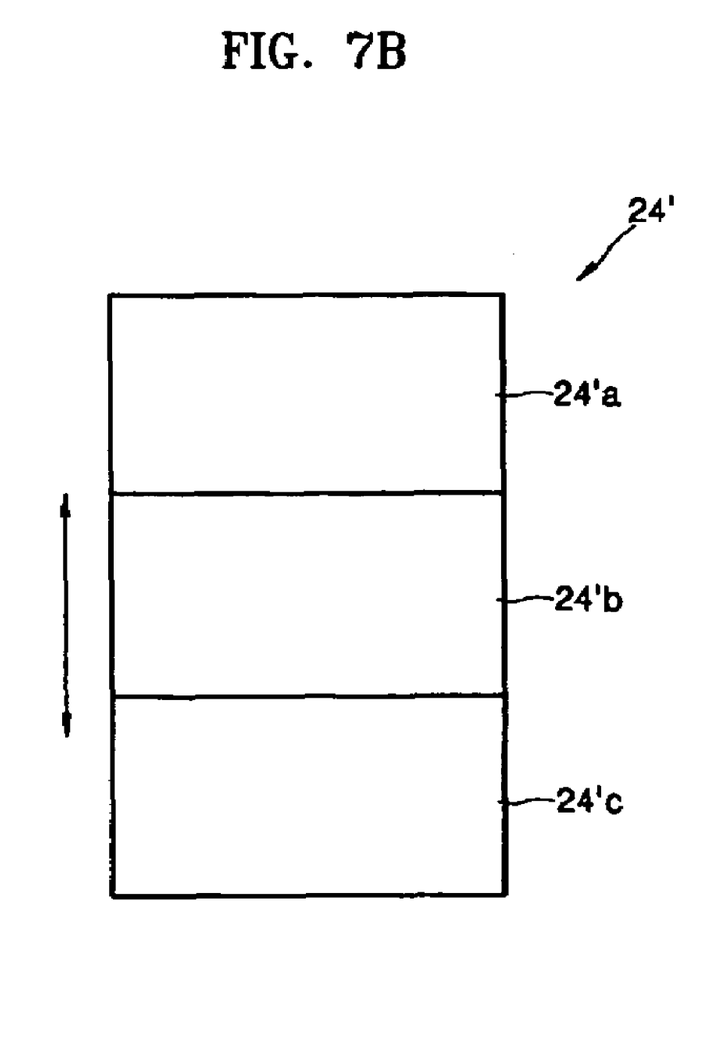
FIG. 7B is a front view illustrating a first diffractive optical element of the projection system of FIG. 7A.

FIG. 7B is a front view illustrating the first diffractive optical element 24'. Referring to FIG. 7B, the first diffractive optical element 24' has the rectangular shape and is divided into first, second, and third segments 24a', 24b', and 24c' having diffractive patterns that correspond to red (R), green (G), and blue (B) beams, respectively. The first diffractive optical element 24' reciprocates vertically such that the red, green, and blue beams sequentially emitted by the laser light source 20 pass through the first, second, and third segments 24a', 24b', and 24c', respectively. Since the first diffractive optical element 24' linearly reciprocates, blue, green, and red beams are sequentially emitted from the first diffractive optical element 24'. The display device 28 causes image signals to be synchronized with the color beams emitted by the laser light source 20.

As described above, the various embodiments of the present general inventive concept efficiently remove laser speckle by temporally and spatially averaging laser beams.

The various embodiments of the present general inventive concept provide an illumination system with a laser light source, which significantly reduces or removes speckle of a laser beam, and a single-panel projection system that provides improved image quality by employing the illumination system.

By using a diffractive optical element divided into segments having diffractive patterns that correspond to a plurality of wavelengths, the embodiments of the present general inventive concept achieve a maximum diffraction efficiency for each wavelength. By rotating or linearly reciprocating the diffractive optical element to temporally and spatially average a laser beam, laser speckle can be efficiently eliminated. By reducing a divergence angle using the diffractive optical element, the embodiments of the present general inventive concept also provide a slim and compact projection system.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An illumination system, comprising:
a laser light source to sequentially emit a plurality of laser beams; and
a first diffractive optical element that moves with respect to the laser light source and is partitioned into a plurality of segments each representing a color and each having diffractive patterns that correspond to the plurality of laser beams and to move synchronously with the sequential emission of the plurality of laser beams,
wherein the first diffractive optical element removes laser speckle by temporally averaging the plurality of laser beams.

2. The illumination system of claim 1, wherein the first diffractive optical element has a wheel-like shape and is rotatable.

3. The illumination system of claim 1, wherein the first diffractive optical element has a rectangular shape and is linearly reciprocatable.

4. The illumination system of claim 1, wherein the first diffractive optical element converts an incident beam emitted by the laser light source into a plurality of beamlets and superimposes and focuses the plurality of beamlets to spatially average the incident beam.

5. The illumination system of claim 1, further comprising:
a second diffractive optical element to shape a beam that passes through the first diffractive optical element to match an aspect ratio of a display device that produces an image from the shaped beam.

6. The illumination system of claim 5, wherein the second diffractive optical element controls a divergence angle of an incident beam to increase an F-number.

7. The illumination system of claim 1, wherein each of the plurality of segments of the first diffractive optical element comprises a plurality of diffractive unit cells to modify a plurality of partial beams of an incident beam, and each of the plurality of partial beams includes a plurality of beamlets.

8. The illumination system of claim 1, wherein each of the plurality of segments of the first diffractive optical element include a plurality of unit cells to modify partial beams of an incident beam, and each of the plurality of segments of the first diffractive optical element is designed to reduce a laser speckle according to:

$$C = \frac{\sqrt{\langle I_i^2 \rangle - \langle I_i \rangle^2}}{\langle I_i \rangle} = \frac{\sigma}{\mu} \times 100(\%)$$

where C represents a contrast of the laser speckle, $I_i$ represents an intensity of an i-th unit cell of a corresponding segment of the first diffractive optical element, $\sigma$ represents a standard deviation of the intensity values $I_i$ of the plurality of unit cells of the corresponding segment, and $\mu$ represents a mean intensity value.

9. The illumination system of claim 1, wherein each of the plurality of segments of the first diffractive optical element is designed to have an optimal diffraction efficiency according to:

$$D_{\mathit{eff}} = \left\{ \frac{\mathrm{Sin}[\pi \times (\lambda_D / \lambda - 1)]}{\pi \times (\lambda_D / \lambda - 1)} \right\}^2$$

where $\lambda_D$ and $\lambda$ represent a design wavelength of a predetermined segment of the first diffractive optical element and an actual wavelength used in the predetermined segment, respectively.

10. An illumination unit usable in an optical projection system, comprising:
a laser unit to emit a light beam;
a laser speckle removal unit to receive the light beam from the laser unit that moves with respect to the light beam and is partitioned into a plurality of segments each representing a color and to remove a portion of a laser speckle by averaging intensities of the light beam spatially and temporally to produce a uniform light beam; and
an image creation unit to receive the uniform light beam from the laser speckle removal unit and to create an image from the uniform light beam.

11. The illumination unit of claim 10, wherein the laser speckle removal unit comprises a plurality of segments having unit cells, and the unit cells of the segments have corresponding patterns.

12. The illumination unit of claim 11, wherein the pattern of each unit cell comprises a translucent cell including a transparent portion.

13. The illumination unit of claim 11, wherein the pattern comprises first areas and second areas dividing the first areas.

14. The illumination unit of claim 10, further comprising:
a shaping unit disposed between the laser speckle removal unit and the image creation unit to shape the uniform light beam according to a geometry of the image creation unit.

15. The illumination unit of claim 14, wherein the image creation unit comprises a rectangular display panel to sequentially modulate pixels of the uniform light beam according to an image signal, and the shaping unit modifies the uniform light beam to correspond to an aspect ratio of the rectangular display panel.

16. The illumination unit of claim 14, wherein the shaping unit converts the uniform light beam from having a circular cross section to a rectangular cross section by controlling a divergence angle of the uniform light beam.

17. The illumination unit of claim 10, wherein the light beam emitted by the laser unit comprises a plurality of sequentially alternating wavelengths and the laser speckle removal unit comprises a diffractive optical element having a plurality of segments having diffraction patterns that correspond to the plurality of sequentially alternated wavelengths, and the diffractive optical element switches a current segment through which the light beam passes according to a current wavelength of the light beam to temporally average the intensities of the light beam.

18. The illumination unit of claim 17, wherein each of the plurality of segments of the diffractive optical element comprises a plurality of unit elements to divide the light beam into a plurality of partial beams having different phases, to superimpose the plurality of partial beams on one another, and to focus the plurality of superimposed partial beams to spatially average the intensities of the light beam.

19. The illumination unit of claim 17, wherein the diffractive optical element emits the light beam having the current wavelength that is equal to a design wavelength of the diffraction pattern of the current segment so as to obtain substantially a 100% diffraction efficiency.

20. The illumination unit of claim 17, wherein the diffractive optical element has one of a wheel shape having the plurality segments in a radial arrangement and a rectangular shape having the plurality of segments arranged adjacent to one another.

21. The illumination unit of claim 20, wherein the laser speckle removal unit further comprises an actuator to switch the current segment through which the light beam passes.

22. The illumination unit of claim 20, wherein the diffractive optical element includes a first segment having a diffraction pattern that corresponds to a blue light wavelength, a second segment having a diffraction pattern that corresponds to a red light wavelength, and a third segment having a diffraction pattern that corresponds to a green light wavelength, and the diffractive optical element is moved in synch with the sequential alternation of the wavelengths, and the laser unit comprises a first laser to emit a light beam of the blue light wavelength, a second laser to emit a light beam of the red light wavelength, and a third laser to emit a light beam of the green light wavelength.

23. The illumination unit of claim 10, wherein the laser speckle removal unit comprises a diffractive optical element having a plurality of unit elements to divide the light beam into a plurality of partial beams having different phases, to superimpose the plurality of partial beams on one another, and to focus the plurality of superimposed partial beams to spatially average the intensity of the light beam.

24. A projection system, comprising:
a laser light source to sequentially emit a plurality of laser beams;
a first diffractive optical element that is partitioned into a plurality of segments each segment representing a color and having diffractive patterns that correspond to the plurality of laser beams to remove laser speckle by moving synchronously with the sequential emission of the laser beams in such a manner as to temporally average the plurality of laser beams;

a second diffractive optical element to shape a beam that passes through the first diffractive optical element to match a geometry of a display device that produces an image from the shaped beam;

a display device to produce the image using the shaped beam that passes through the second diffractive optical element; and a projection lens unit to enlarge and project the produced image onto a screen.

25. The projection system of claim 24, wherein the first diffractive optical element has a wheel-like shape and is rotatable.

26. The projection system of claim 24, wherein the first diffractive optical element has a rectangular shape and is linearly reciprocatable.

27. The projection system of claim 24, wherein the first diffractive optical element converts an incident beam emitted by the laser light source into a plurality of beamlets and superimposes and focuses the plurality of beamlets, thereby spatially averaging the incident beam.

28. The projection system of claim 24, wherein the second diffractive optical element shapes the beam that passes through the first diffractive optical element to match an aspect ratio of the display device.

29. The projection system of claim 28, wherein the second diffractive optical element controls a divergence angle of an incident beam to increase an F-number.

30. The projection system of claim 24, wherein the display device comprises one of a transmissive liquid crystal display (LCD), a Liquid Crystal on Silicon (LCoS) display, a Deformable Micromirror Device (DMD), and a Grating Light Valve (GLV).

31. An optical projection system, comprising:

a screen;

an illumination unit to emit an incident light beam including a movable diffractor divided into a plurality of segments arranged about the center of the diffractor, each of the plurality of segments representing a color and having at least two wavelength dependent diffraction patterns to create a uniform beam substantially without laser speckle by averaging intensities of the incident light beam;

an image creation unit to create an image from the uniform beam; and at least one projection lens to enlarge and project the created image onto the screen, wherein the illumination unit further includes:

a laser unit to emit a light beam having a wavelength that alternates between a plurality of color wavelengths, and the movable diffractor includes a plurality of segments having a plurality of diffraction patterns that correspond to the plurality of color wavelengths to average the light beam temporally by alternating among the plurality of segments in synch with the alternation between the color wavelengths, to average the light beam spatially by dividing the light beam into a plurality of partial light beams and superimposing the partial light beams on one another, and to create the uniform beam accordingly; and a second diffractive optical element to convert the uniform beam to have a shape that corresponds to the image creation unit.

32. A method of producing a uniform beam in an illumination unit usable with an optical projection system, the method comprising:

creating a light beam having sequentially alternating wavelengths;

converting the light beam to a uniform beam by rotating a diffractive optical element having a plurality of segments each representing a color and spatially and temporally averaging the light beam; and providing the uniform beam to an image creation device.

33. The method of claim 32, wherein the temporal averaging of the light beam comprises:

controlling a diffraction optical element including a plurality of segments having a plurality of wavelength dependent diffraction patterns that correspond to the sequentially alternating wavelengths to switch between the plurality of segments in synch with the sequentially alternating wavelengths.

34. An illumination system comprising:

a laser light source to sequentially emit a plurality of laser beams; and a first diffractive optical element that is partitioned into a plurality of segments having diffractive patterns that correspond to the plurality of laser beams and to move synchronously with the sequential emission of the plurality of laser beams wherein the first diffractive optical element reduces laser speckle according to a standard deviation of the intensity values of the plurality of laser beams and the mean intensity value of the plurality of laser beams.

* * * * *